Figure 3:
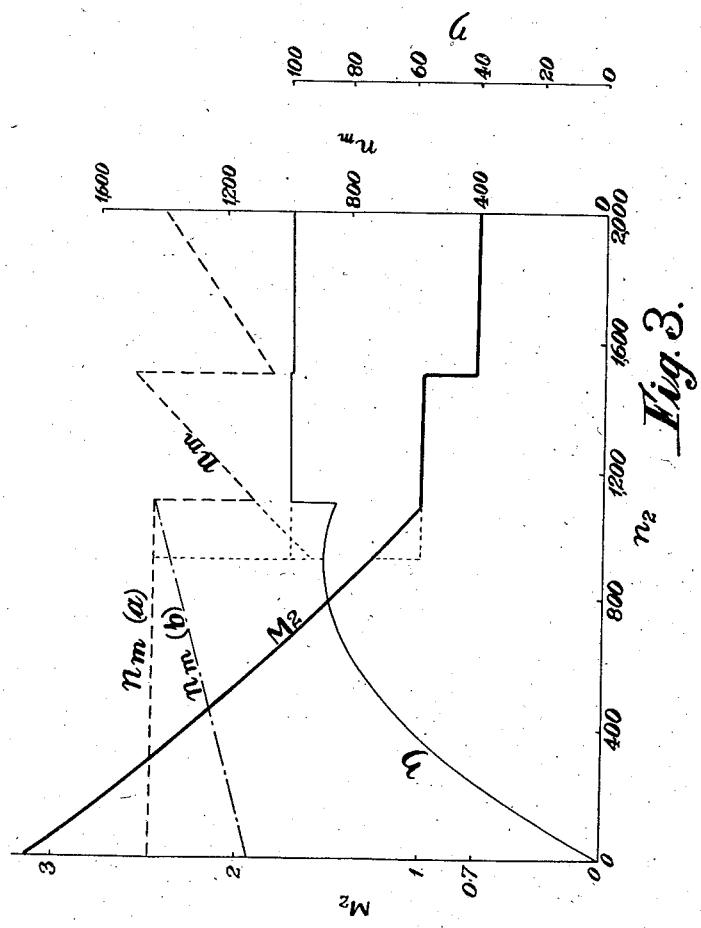

Aug. 20, 1940.  H. SINCLAIR  2,212,278
VARIABLE-SPEED POWER-TRANSMISSION MECHANISM
Filed Oct. 12, 1938  2 Sheets-Sheet 1
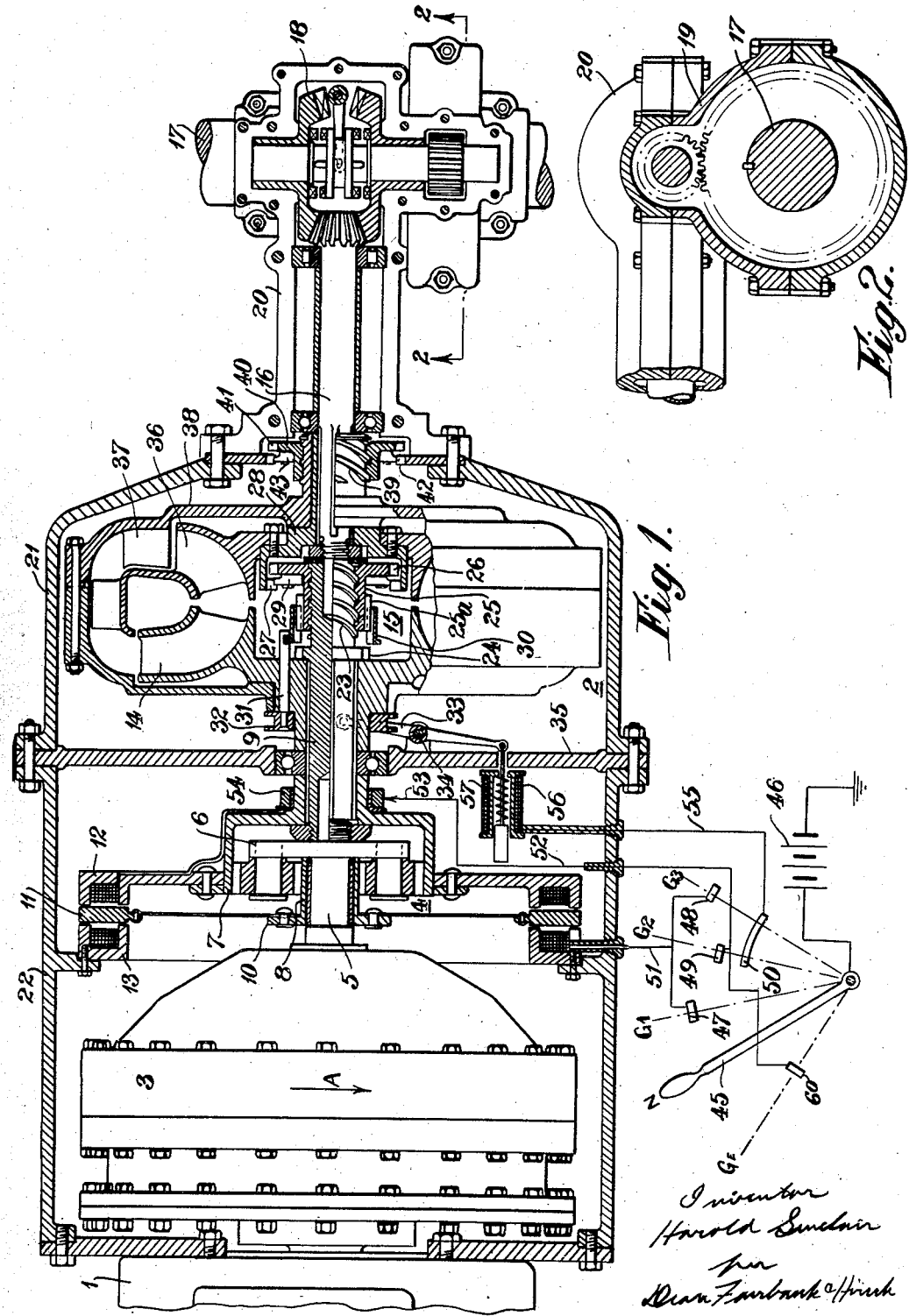

Patented Aug. 20, 1940

2,212,278

UNITED STATES PATENT OFFICE 2,212,278

VARIABLE-SPEED POWER-TRANSMISSION MECHANISM

Harold Sinclair, Kensington, London, England

Application October 12, 1938, Serial No. 234,517
In Great Britain January 15, 1938

4 Claims. (Cl. 74—189.5)

This invention relates to power-transmission mechanism, especially but not exclusively for vehicles, and of the type embodying a hydraulic power-transmitter comprising or consisting of a turbo torque-converter which is adapted to increase the torque applied thereto by a driving engine and which is provided with an auxiliary coupling device in parallel, such as a mechanical clutch, or a hydraulic turbo-coupling of the variable-filling type, whereby a "direct" drive can be established, that is to say a drive in which the torque-transmission ratio is 1 to 1.

Such turbo torque-converters commonly provide an output torque ranging from about 4.5 times the input torque when the output shaft is stalled, to a value equal to the input torque when the ratio of speeds of the driven and the driving shafts $$\frac{n_2}{n_1}$$

attains a particular value such as $$\frac{0.66}{1}$$

depending on the design.

Where it is desired to increase the ranges of torque and speed yielded by such a turbo converter, it is known to couple to it in series a mechanical change-speed gear, which is capable of being changed while running, and which is arranged to be driven by the output shaft of the converter for the obvious reason that a converter required to absorb the normal power output of the driving engine when for example the output shaft is stalled must be run at only one input speed; or if the converter has a rising input speed characteristic with increase of secondary shaft speed, the driving engine must be capable of working over the corresponding range of power and speed if the full capacity of the engine and converter in combination is to be attained.

Since turbo torque-converters are relatively expensive to put into production, it is convenient to adopt as few different standard designs as possible; and where such a converter is required to be used with a variety of standard types of driving engine with different normal rated powers and speeds, in most cases it cannot be efficiently coupled directly to the engine, and a speed-increasing gearing of suitable constant ratio is usually employed to connect the engine to the converter so as to enable the size and weight of the converter to be reduced.

The main object of this invention is to provide a power-transmission mechanism of the type set forth which yields ranges of torque and speed beyond those yielded by the turbo torque-converter alone, which is simpler than the known arrangements, and which is readily adaptable for use with engines of different rated powers and speeds.

According to this invention a power-transmission mechanism of the type set forth comprises a mechanical change-speed gear which is capable of being changed while running and which is arranged between the driving engine and the turbo torque-converter. The mechanical change-speed gear may be a two-speed gear adapted to yield a direct drive and a speed-increasing drive, and the ratio of the speeds of its output shaft, on the two different drives respectively, with a constant engine speed, may conveniently be approximately equal to or somewhat narrower than the speed ratio $$\frac{n_2}{n_1}$$

of the turbo torque-converter when its torque ratio is 1 to 1. Where $$\frac{n_2}{n_1}$$

has a value of $$\frac{0.66}{1}$$

the ratio of the speeds of the two-speed gear may usefully range between 1 to 1.2 and 1.6.

The mechanical change-speed gear may be a planetary gear having a friction clutch and a friction brake for engaging the respective speeds, such for example as a gear having electromagnetic clutch and brake devices of the Cotal type; or it may be of the synchro-self-shifting type with positive gear-selecting clutch and stop devices, as described in my patent application Serial No. 169,973 filed October 20, 1937.

The torque-converter MAY be of the Voith type, as described in United States Patent No. 2,067,209, with reference to Fig. 6 thereof, having a turbo coupling in parallel and control means operable for maintaining at will only one or the other of the two turbo circuits filled at any one time; or it may be of the Lysholm-Smith or equivalent type, as disclosed in United States Patent No. 1,900,119 having a two-way mechanical clutch for connecting the input shaft alternatively to the converter impeller and to the output shaft, the converter turbine being adapted to drive the output shaft through a disengageable clutch, for example a free wheel; or the torque-converter may be of the synchro-self-shifting type hereinafter described.

In the accompanying drawings are shown diagrammatically a constructional example of the invention as applied to a locomotive driven by a Diesel engine, and Fig. 1 is a part-sectional plan of the power-transmission system, Fig. 2 is a sectional elevation of a part thereof, taken on the line 2—2 in Fig. 1, and Fig. 3 is a graph showing the performance of this system.

The engine 1 in this example has a normal rating of 200 H. P. at 1400 R. P. M. The torque-converter which is generally denoted by 2, and which is shown as having a two-stage turbine but which may have any desired number of stages, is designed to absorb 200 H. P. at 2000 R. P. M., and it yields a ratio of secondary torque M2 to primary torque M1 equal to 1 to 1 when $$\frac{n_2}{n_1} = \text{about } \frac{1}{1.5}$$

The engine is connected, if desired through a shock-absorbing coupling such as a hydraulic turbo coupling 3, to a planetary change-speed gear, which is generally denoted by 4 and which is capable of being changed while running. The driven shaft 5 of the turbo coupling 3 is fixed to the planet-carrier 6 of the planetary train, while the annulus 7 is fixed to the primary shaft 9 of the converter 2 and the sun wheel 8 is integral with a hub 10 to which is fixed an armature ring 11 engageable alternatively with an electromagnetic clutch element 12 fixed on the annulus 7 to yield direct drive, and with an electromagnetic brake element 13 to yield a speed-increasing ratio of 1 to 1.43. Thus the change of speed of the shaft 9, due to changing gear in the planetary gear, expressed as a ratio, is of the same order as the speed ratio of the torque-converter when its torque ratio is in the neighbourhood of 1 to 1. The shaft 9 is directly connected to the impeller 14 of the torque-converter and to its parallel alternative direct-drive coupling, which is generally denoted by 15. The output shaft 16 of the torque-converter is connected to a driving axle 17 of the locomotive by the usual reversing gearing 18 and reduction gearing 19 of appropriate ratio. The reversing and reduction gears are contained in a casing 20 which is journalled on the axle 17 and which is rigidly fixed to a bell housing 21 in turn fixed to a tubular housing 22 rigid with the engine 1, the last being mounted on the locomotive frame by flexible bearings (not shown) in known manner.

The direct-drive coupling 15 of the converter 2, which is a known synchro coupling as described in Patent No. 1,862,188 of N. Legge, is arranged as follows. The primary shaft 9 is provided with left-hand helical splines 23 and with an axially splined collar 24. A nut 25 is engaged with the splines 23 and is provided with teeth 26 engageable with teeth 27 on a drum 28 which is fixed to the shaft 16. One or more pawls 29 pivotally mounted on the nut co-operate with the teeth 27 and are so positioned, relative to the teeth 26, as to cause the teeth 26 and 27 to intermesh cleanly should the shaft 9 begin to lag behind the shaft 16, when they are rotating in the forward direction, as shown by the arrow A. A locking sleeve 30 provided with internal axial splines is engaged with splines 25a on the nut 25. The sleeve 30 can engage with the splined collar 24 only when the nut 25 is in its left-hand position, in which the teeth 26 and 27 are meshed together. The sleeve 30 is actuated by a plurality of rods, such as 31, which are slidable in holes in the hub of the impeller 14, and which are fixed to a striking ring 32 actuated by a yoke 33 pivoted at 34 to a diaphragm 35 of the fixed housing.

The turbine 36 of the converter 2 is fixed to the drum 28 on the output shaft 16, and the reaction blading 37 of the converter is fixed in a casing 38 free to rotate in the forward direction, but prevented from rotating backwards by a Legge synchro-coupling comprising left-handed helical splines 39 on the casing boss and a nut 40 having teeth 41 engageable, under the control of pawls 43, with a toothed annulus 42 fixed to the bell housing 21.

The change-speed gear 4 and the direct-drive coupling 15 are preferably provided with interlocked control mechanism. A control handle has the form of a switch blade 45 electrically connected through a battery 46 to earth. The blade 45 co-operates with contacts 47, 48, 49 and 50. The contacts 47 and 48 are connected by a conductor 51 to one terminal of the winding of the brake element 13, the other terminal of which is earthed. The contact 49 is connected by a conductor 52 to a brush 53 co-operating with an electrically insulated slip ring 54 which forms one terminal of the winding of the clutch element 12, the other terminal of which is earthed. The contact 50 is connected by a conductor 55 to one terminal of the winding of a solenoid 56 arranged, when energized, to rock the yoke 33 so as to urge the striking ring 32 to the left. A spring 57 biases the yoke in the opposite direction. The other terminal of the solenoid winding is earthed. Four positions of the control member 45 are denoted by N (neutral) and G1, G2 and G3 (low, middle and high speeds).

In starting from rest the control member 45 is moved from position N to position G1, so that the brake element 13 is energized and the planetary unit 4 is accordingly put in high gear. The converter is operative since the direct-drive coupling 15 is disengaged. If the converter has a constant input speed characteristic, the converter input shaft accordingly runs at a speed of 2000 R. P. M. absorbing the full power of the engine at its normal speed of 1400 R. P. M. and the locomotive accelerates under a torque in the output shaft 16 of the converter equal to $$\frac{14}{20} M_m \frac{M_2}{M_1}$$

where $M_m$ is the engine torque.

In Fig. 3 (where the engine torque is taken as constant), the horizontal scale denotes speed of the converter output shaft 16 in R. P. M.; the ordinate scale $M_2$ denotes the torque in the shaft 16 in terms of the engine torque as unity; the ordinate scale $n_m$ is the engine speed; and $\eta$ is the efficiency of transmission from the engine to the shaft 16. The parts of the $n_m$ curve marked (a) and (b) refer to converters with a constant, and a rising, input speed characteristic respectively.

When the speed of the converter output shaft 16 reaches about 1100 R. P. M.

$$\frac{M_2}{M_1}$$

will be about 1.5 to 1, so that further acceleration on the converter drive becomes less efficient than by changing to direct drive throughout. The system is accordingly changed to its condition for normal running by moving the control member 45 to position G2 and momentarily retarding the engine. The brake element 13 is de-energized and the clutch element 12 is energized, so that the planetary gear 4 changes down to direct drive. The solenoid 56 is also energized, so that the striking ring 32 and the locking sleeve 30 are urged to the left. Since at first the splines in the locking sleeve are out of register with the splines on the collar 24, the locking sleeve is unable to engage this collar. However, as soon as the speed of the shaft 9 begins to drop below that of the shaft 16, the nut 25 is moved to the left, bringing these splines in register so that the locking sleeve 30 engages the collar 24. The engine is now caused to generate power, and, as the nut 25 is prevented by the sleeve 30 from rotating relatively to the shaft 9, the direct-drive coupling remains engaged. The engine speed and the speed of the shaft 15 will be about 1100 R. P. M. and the torque in this shaft will be equal to the engine torque $M_m$, since the drive is direct throughout.

The simultaneous changing of the mechanical gear to the lower-speed ratio and of the converter to direct drive, which effects the change from low or starting speed to the middle or normal speed in the system as a whole, is an important feature of this invention, since it enables the converter to be cut out of action, without any abrupt drop in the output torque $M_2$ in consequence of the change, before the converter efficiency has dropped substantially below its maximum value. It will be apparent from Fig. 3 that, if the converter were merely changed to direct drive, without any complementary change of gear in the mechanical gearing, there would be either an abrupt drop in output torque $M_2$, if the change were made near the point of maximum converter efficiency, or the converter would operate on an inefficient part of its characteristic curve if the change were delayed until an abrupt drop in the output torque curve was avoided.

By moving the control member 45 to position $G_3$ the mechanical gear 4 is changed to the high ratio and the converter 2 is left in direct drive, so that an over-drive speed is obtained, in which, when the engine speed is 1400 R. P. M., the speed of the converter output shaft is 2000 R. P. M., as suited for a high cruising speed of the vehicle under easy running conditions.

An alternative change point between first and second speeds, at a value of $n_2$ of about 950 R. P. M. is indicated in Fig. 3 by faint dotted lines.

The improved transmission mechanism may be advantageously employed on vehicles driven by internal-combustion engines on tropical mountainous routes, in order to compensate for the variation in maximum power output of the engine with changed altitude and temperature when a variable supercharger is not employed. The power output of the engine may fall by say 30 per cent. under conditions of high altitude accompanied by high temperature in the course of a journey, and as the power absorbed by the torque-converter varies as the cube of the speed of its input shaft, the change-speed gear between the engine and the converter may provide alternative ratios which will enable the converter to utilize nearly the full power available when climbing at various altitudes, in addition to providing an intermediate direct drive gear of high efficiency.

Referring to Fig. 1, when the control member 45 is moved to the emergency position $G_E$, it energises a contact 60 which is connected to the conductor 52, with the result that the planetary gear is put into direct drive while the converter remains operative. Thus, although the engine, owing to the atmospheric conditions, is able to generate only a part of the normal maximum torque that it could generate at sea level, it is permitted to run up to its maximum speed owing to the reduced torque load applied to it by the converter through the direct drive, instead of the overdrive ratio, in the planetary gear.

I claim:

1. A power transmission system comprising an engine, a turbo torque-converter, an auxiliary coupling device in parallel with said torque-converter whereby a "direct" drive can be established, control means for said auxiliary coupling device, and a mechanical change-speed gear which is capable of being changed while running and which connects said engine to said torque-converter, the characteristic of said torque converter and the ratio of a higher-speed gear in said mechanical gear being such that, when said torque-converter is operative and said higher-speed gear is engaged, said engine can attain substantially its normal continuous-rating torque and speed.

2. A power transmission system comprising an input shaft, a turbo torque-converter, an auxiliary coupling device in parallel with said torque-converter whereby a "direct" drive can be established, a mechanical change-speed gear which is capable of being changed while running and which connects said input shaft to said torque-converter, and a common control member operatively connected with means for engaging said auxiliary coupling device and with means for changing gear ratio in said mechanical gear, said control member being operable to cause a high-speed ratio to be established in said mechanical gear when said auxiliary coupling device is disengaged, and to cause alternative speed ratios to be established in said mechanical gear when said auxiliary coupling device is engaged.

3. A power transmission system comprising an engine, a turbo torque-converter, an auxiliary coupling device in parallel with said torque-converter whereby a "direct" drive can be established, control means for said auxiliary coupling device, and a mechanical change-speed gear which is capable of being changed while running and of yielding a low-speed ratio drive and a high-speed ratio drive and which connects said engine to said torque converter, the ratio of the speeds of the output shaft of said gear, on said two drives respectively, with a constant speed of said engine, being not substantially wider than the ratio of the output speed to the input speed of said torque converter that exists when its torque ratio is 1 to 1, and the ratio of said high-speed ratio drive being so selected in relation to the characteristic of said torque-converter that, when said higher-speed ratio drive is engaged and said auxiliary coupling device is disengaged, said torque-converter permits said engine to attain the speed which it is capable of maintaining at its continuous full load rating.

4. A power transmission system comprising an input shaft, a turbo torque-converter, an auxiliary coupling device in parallel with said torque-converter whereby a "direct" drive can be established, a mechanical change-speed gear which is capable of being changed while running and of yielding a direct drive and a speed-increasing drive having a speed ratio between 1 to 1.2 and 1 to 1.6, and which connects said input shaft to said torque converter, and control means for said auxiliary coupling device and said mechanical gear, said control means being operable to maintain said auxiliary coupling device disengaged while said speed-increasing drive is engaged.

HAROLD SINCLAIR.